United States Patent Office 2,819,733
Patented Jan. 14, 1958

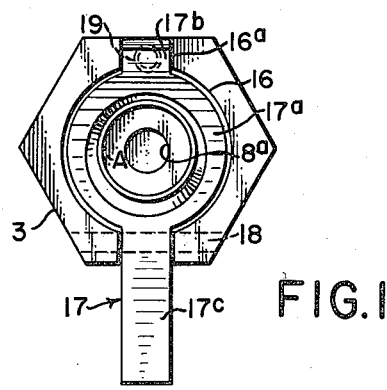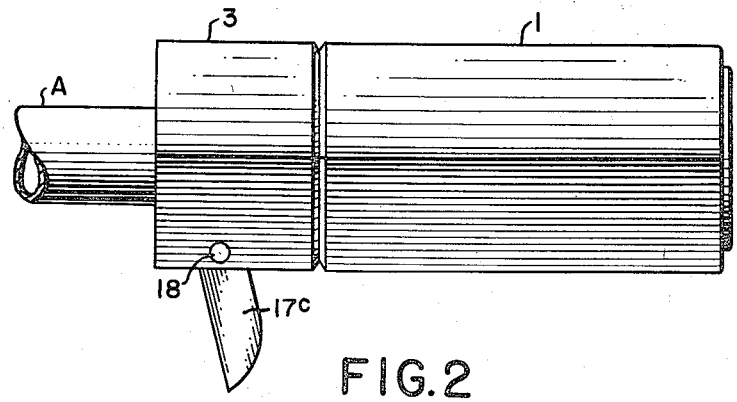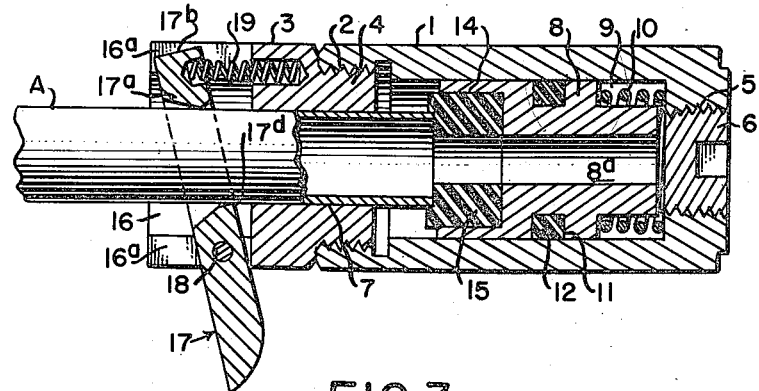

2,819,733

TUBE SEALER AND CONNECTOR

Oliver Maisch, Chicago, Ill.

Application May 15, 1956, Serial No. 585,030

3 Claims. (Cl. 138—89)

Many apparatuses are being manufactured which provide cast or fabricated chambers having one or more tubular inlet and outlet connections. These units must be pressure and/or vacuum tested for leak-proof connections and also for porosity and other defects in materials.

A common practice in industry, for adapting pressure or vacuum test lines to tubular inlet connections or to seal plain ends of tubing, is to solder thereto temporary connections for the testing operation and, after the completion of the test, to pinch, sever and seal by soldering, the end section of the terminal tube. This practice is costly in labor and material because of time consumed in making connections and an excessive waste of tubing. Therefore, some processors use various types of manually operated, threaded compression fittings to make their connections; these all being time consuming and either limited as to working pressures or possessing mechanical deficiencies.

The object of the present invention is to produce a simple and novel device for effecting a leakproof, quickly detachable self-locking connector for joining a testing apparatus and a terminal tube of a unit to be tested, and which shall be equally effective for testing with high pressure air or liquid and, also, with high vacuum requirements.

With many apparatuses it is essential that enclosed chambers or tubular elements therein, be free of foreign matter and even the slightest amount of moisture at the time of permanently sealing it. Since my improved device can be employed to couple such elements to a cleaning or dehydrating apparatus, the invention may be regarded in its broad aspect as having for its object to produce a device adapted to effect a quickly detachable connection for any desired purpose, between the end of a tube and some other member.

Sometimes testing apparatus must be attached to a tube connected with a chamber from which other tubes protrude and which must be sealed during testing operations. A further object of the invention is to construct my new device in such a manner that it may serve simply as a closure for temporarily sealing the end of a tube.

In carrying out my invention I provide an elongated, hollow body member having in one end an opening through which the end of a tube may be inserted, a plunger, actuated by a spring and differential fluid pressure, in said member and having on one end an element for engaging the end edge of such a tube and sealing it, and means on the body member, at said opening, that will allow a tube to move freely into the opening and lock it against withdrawal; the locking means being releasable, at will.

The various features of novelty whereby the present invention is characterized will hereinafter be pointed out with particularly in the claims; but, for a full understanding of the invention and its objects and advantages, reference may be had to the following detailed description taken in connection with the accompanying drawing, wherein:

Fig. 1 is an end view of a device embodying the present invention;

Fig. 2 is a side view of said device; and

Fig. 3 is a longitudinal, axial section through the device.

Referring to the drawing, 1 represents a shell, hexagonal in cross section, closed at one end, and open and internally screwtheaded at the other end, as shown at 2. A detachable head 3 is provided with a neck 4 that is screwed into said open end; the shell and the head forming a two-section hollow body member. The closed end of the shell contains a tapped opening 5 which may be left open, be closed by a plug 6, or receive the screwthreaded end of a pipe or fitting. Head 3 has an axial bore 7 extending throughout the length of the same and its stem.

Within section 1 of the body member is a long cylindrical plunger 8. The end of the plunger facing the end of the body member containing opening 5 is reduced in diameter to provide between the periphery and the surrounding cylindrical wall an annular space 9. Within this annular space is a strong compression spring 10, surrounding the plunger. About midway between the ends of the plunger is a peripheral, circumferential groove 11. In this groove is a packing ring 12, preferably of rubber. In the second end of the plunger is a deep recess 14, coaxial with and of larger diameter than bore 7 in the head section. Within this recess is seated a cylindrical block 15 of rubber or other suitable material for sealing a tube end coming in contact therewith. The plunger contains an axial bore $8^a$, smaller in diameter than bore 7, and extending throughout the length of the same and block 15; so that an annular area on the face of block 15 is exposed to the pressure in the system when the device is attached to a tube A as shown. The pressure against this area is opposed to that against the opposite end of the plunger, with the resulting differential pressure assisting the spring.

The outer end face of head 3 contains a large deep recess 16, the central portion of which is cylindrical and merges into two arms or branches $16^a$ diametrically opposed and opening out through the periphery of the head. Located within this recess is an automatic tube locking device comprising a long lever 17 consisting of a large ring-shaped part $17^a$ from which project two diametrically opposed arms, $17^b$ and $17^c$; the latter arm being much the longer of the two. The parts are so proportioned that the ring portion lies within the central, cylindrical part of the recess, while the two arms are entered in the branches of the recess. The lever is secured to the head by a pivot pin 18 that passes through arm $17c$ close to the ring-shaped part of the lever and into the head on both sides of the arm; arm $17c$ extending well beyond the periphery of the body member to permit manual operation of the same. The ring shaped portion of the lever is large enough to permit the end of a tube A to pass through the same and into the interior of the body member. The opening in the ring is so shaped that a sharp edge $17^d$ is provided to bite into the tube and prevent retreat of the same from the body member whenever the lever is in a given angular position.

In the arrangement shown, there is a compression spring 19 behind the short arm section of the lever protruding from the ring section. This spring tends constantly to hold the lever canted into its locking position, as shown, so that edge $17^d$ is in contact with a tube to which the device is being or has been applied. If this contact had any effect during an entering movement of the tube, it would only be a tendency to bring the lever more nearly at right angles to the tube and thus loosen the grip of the lever. But, if it be attempted to withdraw the tube, any resulting movement of the lever will be to tighten the grip on the tube. This is due to the fact that edge 17$^d$ in its normal position, is at the end of a radius from the axis of hinge pin that is longer than a radius from such axis to the tube, at right angles to the latter; and an outward movement of the tube will tend to bring the radius to the gripping edge more nearly at right angles to the tube and to press that edge more tightly against the tube.

To apply the device to a tube it is simply slipped over the end of the tube until the latter touches the sealing pad or element and then pressed firmly so as to compress spring 10 sufficiently to cause the end of the tube to sink into such element. In this way a good seal is obtained initially.

When testing is done with fluids under pressure, the differential fluid pressure on the plunger is added to the pressure of the spring, so that the holding and sealing action of the device increases as the testing pressures increase.

During vacuum tests the effect of the fluid pressures to which the plunger is subjected is reversed, being opposed to that of the spring. However, by using a spring of sufficient tension, a constant seal is maintained.

When the device is used simply for the purpose of closing an end of a tube or tubular fitting, the plug 6 must be in tapped opening 5. The seal will then be maintained, with or without diminished pressure, in the same manner as though another tube or fitting were screwed into the tapped hole.

If desired, the device may be used as a self-sealing coupling, since fluids can flow freely through the device from a tube, upon which it is locked, and out through opening 5 into space or into a pipe or fitting screwed into such opening.

In every instance, however, the greater the pressure on the plunger, the tighter will be the grip of the device on the tube to which it has been applied.

To detach the device from a tube one needs only press lever 17 toward the left, as viewed in Figs. 2 and 3, namely in the direction to shift it into a position more nearly at right angles to the tube, in order to release the tube. If the pressure of one's thumb should be insufficient to move the lever it may be struck a light blow by some object. As soon as the grip of the lever on the tube is broken in this manner, spring 10 drives the plunger toward the left. This movement of the plunger results in ejecting the piece of tubing remaining in the device, if the tube has been pinched, severed and sealed by soldering; or, if the device has been used as a temporary closure, the reaction of the spring results in driving the device off the tube. In every case the device is ready for use elsewhere as soon as the lock is released.

Because the application of the device to a tube is effected, instantaneously, there is a very substantial saving of time achieved through the use of the same. In some instances the saving may be as much as five minutes, so that as much as a half hour may be saved in testing apparatus requiring a half dozen connections to be made.

Since the locking of the tube in the device is automatic, effective locking is achieved and maintained without regard to the presence or absence of fluid pressure in the device.

I claim:

1. A device of the character described, comprising a hollow body member, a plunger within and slidable lengthwise in said member, a spring between one end of the plunger and one end wall of said member tending to press the plunger toward the second end of said member, the wall at the second end of said member, containing a bore for the admission of a tube, a yieldable element on the second end of the plunger for engaging and sealing the end of such tube, said plunger and said yieldable element containing a bore extending through the same lengthwise of the bore and coaxial with said bore in the body member, a locking lever hinged to the second end of said member so as to permit it to swing with its longitudinal center in a plane containing the axis of said bores, a spring on said member tending constantly to hold said lever at an acute angle to said axis, and said lever containing an opening registering with that in the body member and bounded by an edge that rides freely on a tube entering the body member and bites into the tube and locks it when a retreat of the tube is attempted.

2. A device as set forth in claim 1, wherein the body member is formed of two sections one of which is in screw-threaded relation with the other and contains the bore for the entry of a tube and on which the locking lever is mounted.

3. A device of the character described, comprising a hollow body member, a plunger within and slidable lengthwise in said member, a spring between one end of the plunger and one end of said member tending to press the plunger toward the second end of said member, the latter end containing a bore, coaxial with and smaller in diameter than the plunger, for admission of a plain tube, a yieldable element on the second end of the plunger for engaging and sealing the end of such a tube, said plunger and said sealing element containing a bore coaxial with and smaller in diameter than the aforesaid bore, and means at said second end of said member for engaging the exterior of such tube and locking it against withdrawal from any point to which it may have entered the body member.

References Cited in the file of this patent
UNITED STATES PATENTS

| | | |
|---|---|---|
| 1,761,339 | Hauser | June 3, 1930 |
| 2,191,579 | Nelson | Feb. 27, 1940 |
| 2,520,215 | Kerr | Aug. 29, 1950 |
| 2,581,537 | Maisch | Jan. 8, 1952 |
| 2,700,559 | Jensen | Jan. 25, 1955 |
| 2,714,021 | Froidevoux | July 26, 1955 |

FOREIGN PATENTS

| | | |
|---|---|---|
| 1,077,387 | France | Nov. 8, 1954 |